US00RE38134E

(19) United States
(12) Reissued Patent
Ross et al.

(10) Patent Number: US RE38,134 E
(45) Date of Reissued Patent: Jun. 3, 2003

(54) SYSTEM FOR COMMUNICATIONS WHERE FIRST PRIORITY DATA TRANSFER IS NOT DISTURBED BY SECOND PRIORITY DATA TRANSFER AND WHERE ALLOCATED BANDWIDTH IS REMOVED WHEN PROCESS TERMINATES ABNORMALLY

(75) Inventors: Patrick Delaney Ross, Sunnyvale, CA (US); Bradley David Strand, Los Gatos, CA (US); Dave Olson, Palo Alto, CA (US); Sanjay Singal, Mountain View, CA (US)

(73) Assignee: Silicon Graphics, Inc., Mountain View, CA (US)

(21) Appl. No.: 09/679,447

(22) Filed: Oct. 3, 2000

Related U.S. Patent Documents

Reissue of:
(64) Patent No.: 5,909,594
Issued: Jun. 1, 1999
Appl. No.: 08/805,991
Filed: Feb. 24, 1997

(51) Int. Cl.[7] ..... G06F 13/14; G06F 3/06; G06F 11/00; G06F 13/00

(52) U.S. Cl. ..... 710/20; 710/21; 710/29; 710/32; 710/36; 710/40; 710/117; 370/232; 370/235; 709/235

(58) Field of Search ..... 370/229, 232, 370/235, 236, 253, 395, 455, 465; 710/20, 21, 29, 32, 36, 37, 40, 58, 59, 107, 108, 111, 113–117, 200, 240, 241, 243, 244; 709/235

(56) References Cited

U.S. PATENT DOCUMENTS 5,241,632 A * 8/1993 O'Connell et al. ..... 395/325
5,282,207 A * 1/1994 Jurkevich ..... 370/110.1
5,546,392 A * 8/1996 Boal et al. ..... 370/395
5,574,911 A * 11/1996 D'Angelo et al. ..... 707/1
5,699,345 A * 12/1997 Watanuki et al. ..... 370/232
5,761,445 A * 6/1998 Nguyen ..... 710/100
5,784,569 A * 7/1998 Miller et al. ..... 709/235
5,799,002 A * 8/1998 Krishnan ..... 370/234
5,805,821 A * 9/1998 Saxena et al. ..... 709/231
5,956,509 A * 9/1999 Kevner ..... 709/304
5,991,308 A * 11/1999 Fuhrmann et al. ..... 370/474
6,222,856 B1 * 4/2001 Krishnan et al. ..... 370/464

* cited by examiner

*Primary Examiner*—Jeffrey Gaffin
*Assistant Examiner*—Tanh Nguyen
(74) *Attorney, Agent, or Firm*—Schwegman, Lundberg, Woesnner & Kluth, P.A.

(57) ABSTRACT

The present invention comprises a method and system for implementing prioritized communications in a computer system. The present invention is implemented on a computer system having a microprocessor and a plurality of peripheral devices coupled to the computer system. The system of the present invention determines a first priority level and determines a second priority level. The system of the present invention receives a bandwidth allocation request from a software process to transfer data at the first priority level between two or more peripheral devices. The system subsequently allocates a first priority data transfer bandwidth between the devices in response to the request and performs a first data transfer between the devices using the first priority data transfer bandwidth. In addition, the system of the present invention performs a second data transfer between other devices using a second priority data transfer bandwidth. The second data transfer occurs at a second priority level. Thus, the system of the present invention ensures the first data transfer at the first priority level is not disturbed by the second data transfer. In this manner, the system of the present invention guarantees the first priority data transfer bandwidth for the software process.

24 Claims, 15 Drawing Sheets

40

60

SYSTEM FOR COMMUNICATIONS WHERE FIRST PRIORITY DATA TRANSFER IS NOT DISTURBED BY SECOND PRIORITY DATA TRANSFER AND WHERE ALLOCATED BANDWIDTH IS REMOVED WHEN PROCESS TERMINATES ABNORMALLY

Matter enclosed in heavy brackets [ ] appears in the original patent but forms no part of this reissue specification; matter printed in italics indicates the additions made by reissue.

FIELD OF THE INVENTION

The present invention pertains to a novel system for prioritized communication within a computer system. More particularly, the present invention relates to a method and system for a prioritized communication function which allows communications between multiple devices of a computer system to be organized such that higher priority communications receive a preferential allocation of resources within the computer system.

BACKGROUND OF THE INVENTION

In the past, computers were primarily applied to processing rather mundane, repetitive numerical and/or textual tasks involving number-crunching, spread sheeting, and word processing. These simple tasks merely entailed entering data from a keyboard, processing the data according to some computer program, and then displaying the resulting text or numbers on a computer monitor and perhaps later storing these results in a magnetic disk drive. However, today's computer systems are much more advanced, versatile, and sophisticated. Especially since the advent of digital media applications and the Internet, computers are now commonly called upon to accept and process data from a wide variety of different formats ranging from audio to video and even realistic computer-generated three-dimensional graphic images. A partial list of applications involving these digital media applications include the generation of special effects for movies, computer animation, real-time simulations, video teleconferencing, Internet-related applications, computer games, telecommuting, virtual reality, high-speed databases, real-time interactive simulations, medical diagnostic imaging, and the like.

The proliferation of digital media applications is due to the fact that information can be more readily conveyed and comprehended with pictures and sounds rather than with text or numbers. Video, audio, and three-dimensional graphics render a computer system more user friendly, dynamic, and realistic. However, the added degree of complexity for the design of new generations of computer systems necessary for processing these digital media applications is tremendous. The ability of handling digitized audio, video, and graphics requires that vast amounts of data be processed at extremely fast speeds. An incredible amount of data must be processed every second in order to produce smooth, fluid, and realistic full-motion displays on a computer screen. Additional speed and processing power is needed in order to provide the computer system with high-fidelity stereo sound and real-time, and interactive capabilities. Otherwise, if the computer system is too slow to handle the requisite amount of data, its rendered images would tend to be small, grainy and otherwise blurry. Furthermore, movement in these images would likely be jerky and disjointed because its update rate is too slow. Sometimes, entire video frames might be dropped. Hence, speed is of the essence in designing modern, state-of-the-art computer systems.

One of the major bottlenecks in designing fast, high-performance computer systems is the method in which the various hardware devices comprising the computer system communicate with each other. This method is dictated by the "bus" architecture of the computer system. A "bus" is comprised of a set of wires that is used to electrically interconnect the various semiconductor chips and hardware devices of the computer system. The bus acts as a shared conduit over which electronic signals are conducted, enabling the various components to communicate with each other.

FIG. 1 shows a typical prior art bus architecture 100. Virtually all of today's computer systems use this same type of busing scheme. Computer system 100 includes a central processing unit (CPU) 101 coupled to a host bridge/memory controller 102, which in turn coupled to a random access memory system (hereafter memory) 103 and a bus 104. Various devices 105–108 are coupled to computer system 100 via bus 104.

Bus 104 is used to electronically interconnect the CPU 101 with the memory 103 via bridge/memory controller 102. CPU 101 also accesses the various other devices 105–108 via bus 104. Bus 104 is comprised of a set of physical wires which are used to convey digital data, address information for specifying the destination of the data, control signals, and timing/clock signals. For instance, CPU 101 may generate a request to retrieve certain data stored on hard disk 105. This read request is communicated via bridge/memory controller 102 and via bus 104 to hard disk 105. Upon receipt of this read request, hard disk 105 accesses and reads the desired data from its internal media and subsequently sends the data back over bus 104 to the CPU 101. Once the CPU is finished processing the data, it can be sent via bus 104 for output by a device coupled to bus 104 (e.g., graphics output device 106 or network adapter device 107).

One constraint with this prior art bus architecture is the fact that it is a "shared" arrangement. All of the components 105–108 share the same bus 104. They each rely on bus 104 to meet their individual communication needs. However, bus 104 can transfer only a finite amount of data to any one of devices 105–108 in any given time period (e.g., typically measured as millions of bytes per second, or MB/sec). The total amount of data which can be transferred in a given time period is often referred to as the data transfer "bandwidth" or simply bandwidth. The total amount of data which can be transferred over bus 104 in a given time period is referred to as the bandwidth of bus 104, and for a typical computer system is often between 100 to 300 MBytes/sec.

Computer system 100 uses a relatively simple arbitration scheme to allocate bus bandwidth. Hence, if bus 101 is currently busy transmitting signals between two of the devices (e.g., device 105 and device 106), then all the other devices (e.g., memory 102, device 104, and CPU 103) must wait their turn until that transaction is complete and bus 104 again becomes available. If a conflict arises, an arbitration circuit, usually residing in bridge/memory controller 102, resolves which of the devices 105–108 gets priority of access to bus 104. Because of this, it becomes very difficult to predict and account for how the bandwidth is allocated among devices using the bus. There is not an efficient means for controlling bus bandwidth allocation among competing devices. In computer system 100, as in other typical computer systems, it is difficult to efficiently coordinate among competing devices for use of the computer system's bus.

In addition to coordinating for use of the computer system's bus, another constraint results from the fact that individual hardware devices have internal schemes for coordinating among competing data requests. For example, hard disk 105 may be accessing frames of video data for output to graphics device 106 for display. Subsequently, hard disk 105 receives a request to store data output from CD-ROM 108 and a request for data from network adapter device 107. Since, data retrieval and output by hard disk 105 cannot occur instantaneously, the competing requests are placed into an internal queue. The competing data requests are subsequently serviced by hard disk 105 serially. Thus, when graphics device 106 requests the next frames of data, the request must wait in the internal queue with the other requests. Because of this, a video stream played by graphics device 106 could drop several frames, or even fail entirely. Even though access to the video data may be a much higher priority to the user than the data request from CD-ROM 108 or network adapter 107, the higher priority request must wait in the internal queue with all other lower priority requests.

These constraints make it difficult for current computer systems (e.g., computer systems in accordance with computer system 100) to run the latest, most real-time critical, software applications. As such, applications written for these systems are structured to function around the bandwidth and priority limitations of the computer system 100. The nature of data the applications transfer via the system bus is accordingly dictated by the total bandwidth and bandwidth allocation constraints of the system bus. As a result, there are very few full motion 3D simulation applications written for desktop systems. In the 3D applications that do exist, the realism and richness of the 3D applications are greatly simplified in order to reliably and responsively run without slowing the computer system to a crawl. Tomorrow's applications will be rich 3D simulations. They will include extensive video manipulation by the computer system's processor. Multiple video streams, digital synthesis, digital audio are a few of the many applications envisioned. Given their constraints, typical computer systems (e.g., computer system 100) are rapidly becoming insufficient in light of the demands imposed by tomorrow's new applications.

Thus, what is required is a method and system which greatly increases communication efficiency among applications of differing priority. What is required is a method and system which accommodates the critical real-time data requirements of digital video, digital audio, 3D graphics, real-time compression and decompression applications, and the like. What is further desired is a method of servicing the bandwidth requirements of the above high priority applications without shutting out requests from lower priority applications. The desired solution should provide communications efficiency benefits in computer systems not having solution specific hardware support. The method and system of the present invention provides a novel solution to the above requirements.

SUMMARY OF THE INVENTION

The present invention provides a method and system for greatly increasing communication efficiency among applications of differing priority. The present invention is implemented on a computer system having a microprocessor and a plurality of peripheral devices coupled to the computer system. To provide for prioritized communications, the system of the present invention determines a first priority level and determines a second priority level. The system of the present invention receives a bandwidth allocation request from a software process to transfer data at the first priority level between two or more peripheral devices. The system subsequently allocates a first priority data transfer bandwidth between the devices in response to the request and performs a first data transfer between the devices using the first priority data transfer bandwidth. In addition, the system of the present invention performs a second data transfer between other devices using a second priority data transfer bandwidth. However, the second data transfer occurs at a second priority level. Thus, the system of the present invention ensures the first data transfer at the first priority level is not disturbed by the second data transfer.

The system of the present invention services the bandwidth requirements of the above high priority applications without shutting out requests from lower priority applications. In so doing, the system of the present invention accommodates the critical real-time data requirements of digital video, digital audio, 3D graphics, real-time compression and decompression applications, and the like.

In addition, the present invention includes a priority scheduling process wherein higher priority requests for computer system services are scheduled for processing before lower priority requests. The priority scheduling process of the present invention is capable of functioning without specific supporting hardware. In so doing, the present invention provides communications efficiency benefits in computer systems which do not provide specific hardware support for prioritized peer to peer communication. Hence, the present invention provides advantageous benefits to older applications and computer systems.

In this manner, the system of the present invention guarantees the first priority data transfer bandwidth for the software process. This allows lower priority data to be transferred form one device coupled to the computer system to another device coupled to the computer system without impacting high priority, real-time critical, data transfer bandwidth requirements of applications such as digital video and 3D graphics.

BRIEF DESCRIPTION OF THE DRAWINGS

The present invention is illustrated by way of example and not by way of limitation, in the figures of the accompanying drawings and in which like reference numerals refer to similar elements and in which.

DETAILED DESCRIPTION OF THE INVENTION

Figure 1:
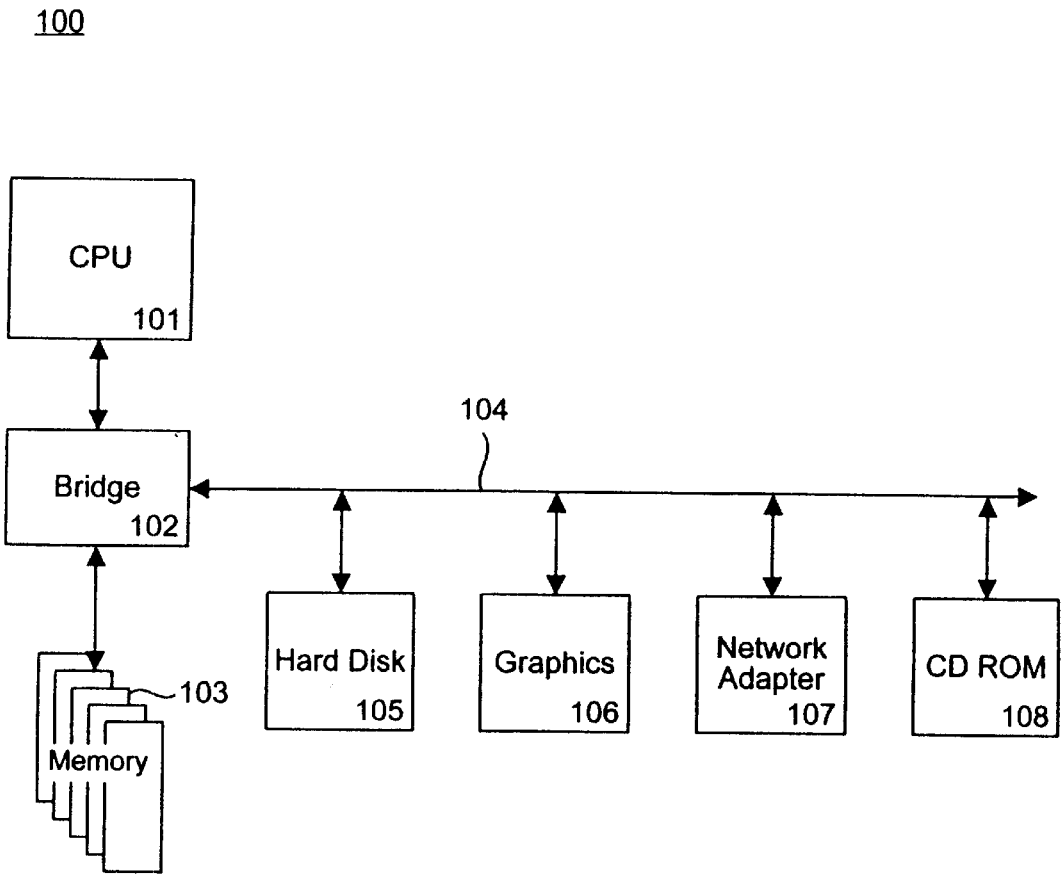
FIG. 1 shows a typical prior art bus architecture used in most computer systems.

In the following detailed description of the present invention, a method and system for prioritized communication in a computer system, numerous specific details are set forth in order to provide a thorough understanding of the present invention. However, it will be obvious to one skilled in the art that the present invention may be practical without these specific details. In other instances well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, step, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "allocating" or "transferring" or "executing" or "defining" or "storing" or "scheduling" or "prioritizing" or the like, refer to the action and processes of a computer system (e.g., computer system 700 of FIG. 13), or similar electronic computing device, that manipulates and transforms data represented as physical (electronic) quantities within the computer system's registers and memories into other data similarly represented as physical quantities within the computer system memories or registers or other such information storage, transmission or display devices.

The present invention is implemented on a computer system having a microprocessor and a plurality of peripheral devices coupled to a packet switched router included in the computer system. To provide for prioritized communications, the system of the present invention determines a first priority level and determines a second priority level. The system of the present invention receives a bandwidth allocation request from a software process to transfer data at the first priority level between two or more peripheral devices. The system subsequently allocates a first priority data transfer bandwidth between the devices in response to the request and performs a first data transfer between the devices using the first priority data transfer bandwidth. In addition, the system of the present invention performs a second data transfer between other devices using a second priority data transfer bandwidth. However, the second data transfer occurs at a second priority level. Thus, the system of the present invention ensures the first data transfer at the first priority level is not disturbed by the second data transfer.

In this manner, the system of the present invention guarantees the first priority data transfer bandwidth for the software process. This allows data to be transferred from one device coupled to the computer system to another device coupled to the computer system without impacting high priority, real-time critical, data transfer bandwidth requirements of applications such as digital video and 3D graphics.

Hence, the present invention provides a method and system for greatly increasing communication efficiency among applications of differing priority. At any given instant, there are several processes running on the computer system. Each process consumes a finite amount of data transfer bandwidth as it performs its designed task. These processes often compete for computer system resources, particularly data transfer resources. On a busy type 100 computer system, high priority software applications are often significantly delayed or even stalled while lower priority applications or processes utilize the computer system's bus for data transfer. If computer system resources are allocated to the high priority applications, the lower priority applications can be "shut off" or starved for system resources.

The system of the present invention services the bandwidth requirements of the high priority applications without shutting out the bandwidth requirements of the lower priority applications. In so doing, the system of the present invention accommodates the critical real-time data requirements of digital video, digital audio, 3D graphics, real-time compression and decompression applications, and the like, while still running lower priority processes. In addition, the present invention includes a priority scheduling process wherein higher priority requests for computer system services are scheduled for processing before lower priority requests. The priority scheduling process of the present invention is capable of functioning without specific supporting hardware. In so doing, the present invention provides communications efficiency benefits in computer systems which do not provide specific hardware support for prioritized peer to peer communication. In this manner, the system of the present invention benefits these "legacy" computer systems in addition to being backward compatible. Hence, the present invention provides advantageous benefits to older applications and computer systems. The method and system of the present invention and its benefits are discussed in detail below.

Figure 2:
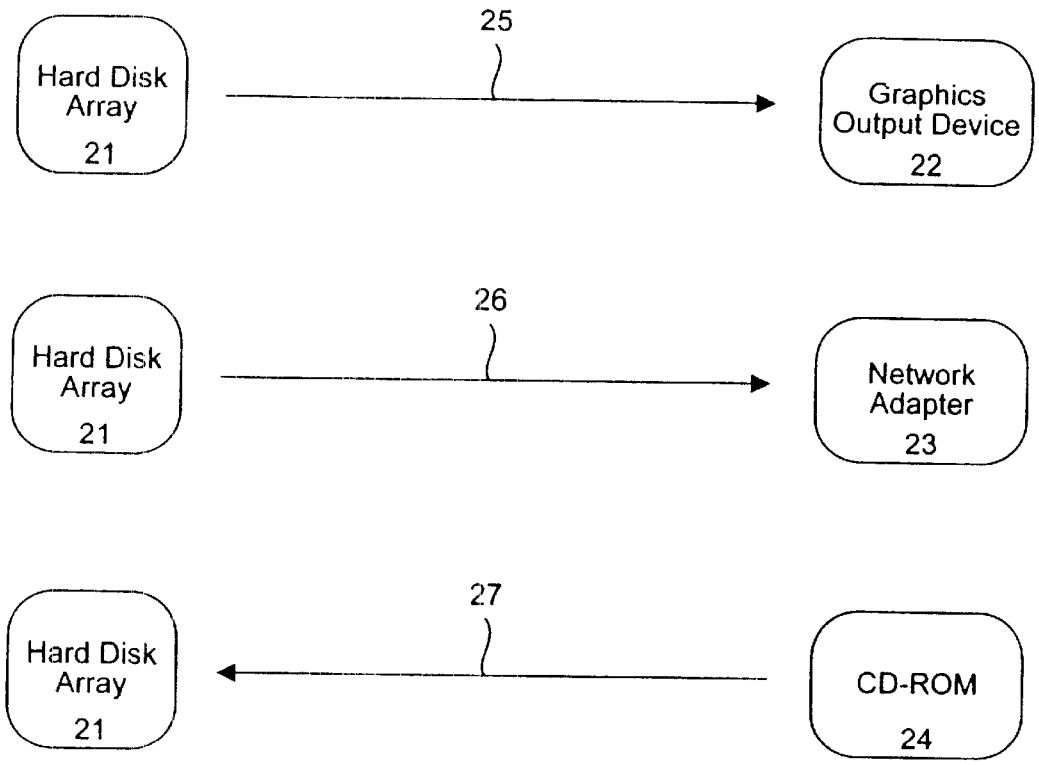
FIG. 2 shows a priority input output diagram in accordance with the present invention.

FIG. 2 shows a priority input output diagram 200 in accordance with the present invention. In FIG. 2, a hard disk array 21 has received a request for a data transfer 25 from the hard disk 21 to a graphics output device 22. In addition, the hard disk array 21 has also received requests for a data transfer 26 from the hard disk array 21 to a network adapter card 23, and a data transfer 27 from a CD-ROM 24 to the hard disk array 21.

Thus, the graphics output device 22, the network adapter card 23, and the CD-ROM 24 are each competing for the data transfer bandwidth of the hard disk array 21. In a conventional computer system, data transfer 25, data transfer 26, and data transfer 27 are typically of the same priority. The respective device drivers for the graphics output device 22, network adapter card 23, and CD-ROM 24 each require computer system resources (e.g., data transfer bandwidth) to either read from or write to hard disk array 21.

As described above, a conventional computer system uses a relatively simple arbitration scheme to allocate bus bandwidth on a shared system bus, wherein graphics output device 22, network adapter card 23, and CD-ROM 24 each arbitrate for owner ship of the system bus in order to complete data transfer 25, data transfer 26, and data transfer 27. In a computer system in accordance with the present invention, however, hard disk array 21, graphics output device 22, network adapter card 23, and CD-ROM 24 are each coupled to a packet switched router included within the computer system (e.g., computer system 700 of FIG. 13). By utilizing the packet switched router (as described below), the computer system in accordance with the present invention can accomplish data transfer 25, data transfer 26, and data transfer 27 simultaneously. The graphics output device 22, network adapter card 23, and CD-ROM 24 each transfer data to or from hard disk array 21 in the form of individually addressed data packets. There is not, however, an unlimited amount of data transfer bandwidth to and from hard disk array 21. Thus, data transfer 25, data transfer 26, and data transfer 27 each compete for the finite amount of data transfer bandwidth to and from hard disk array 21.

Referring still to FIG. 2, data transfer 25 is for a full motion video display software application. Data transfer 25 transfers a video stream comprised of frames of video data from hard disk array to a graphics output device. The video display produced by graphics output put device 22 is often a high resolution, 20–30 frames per second full motion video, thus data transfer 25 involves the transfer of very large amounts of data (often several hundred Mbits/sec or more). The frames of video data need to be transferred to the internal buffers of graphics output device 22 via data transfer 25 in an efficient, orderly manner to prevent buffer under run. If the data transfer bandwidth requirements of data transfer 25 are not met, the video stream played by graphics output device 22 could drop several frames or even fail entirely.

As such, data transfer 25 is a high priority data transfer. Data transfer 26 involves an ordinary file request from an external network via network adapter card 23. Data transfer 27 involves a transfer of graphics data (e.g., 3D object textures) from CD-ROM 24 to hard disk array 21. Hence, since data transfer 26 and data transfer 27 are not as real-time critical with regard to serving the user of the computer system, they are both lower priority data transfers. The system of the present invention ensures high priority data transfer 25 is not degraded by lower priority data transfer 26 and lower priority data transfer 27.

Figure 3:
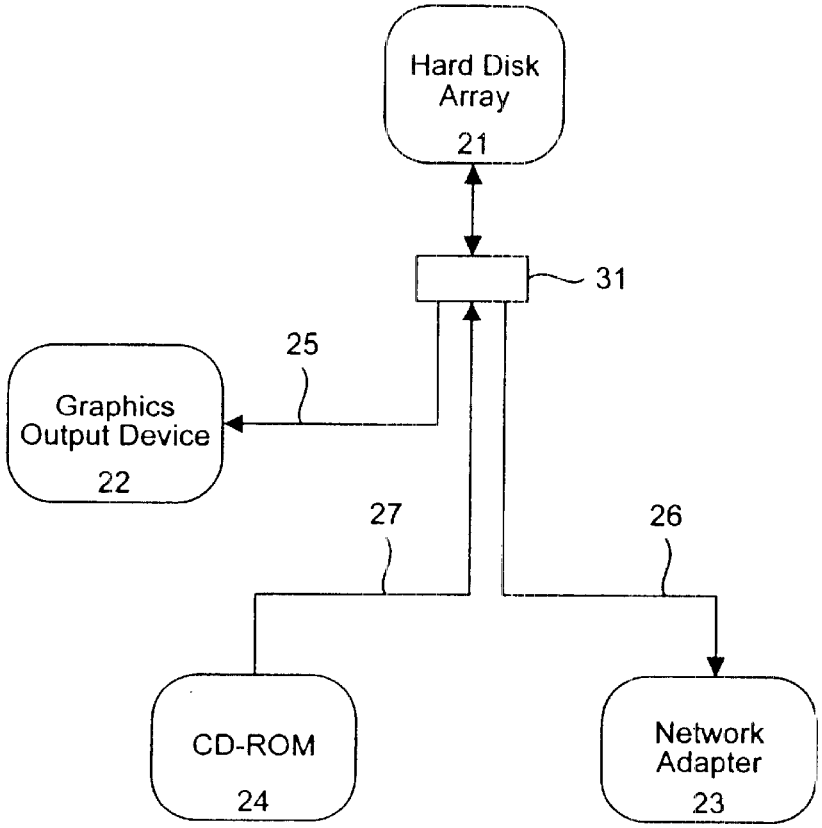
FIG. 3 shows a digram of prioritized data transfer access in accordance with the present invention.

FIG. 3 shows a diagram 30 of prioritized data transfer access in accordance with the present invention. Diagram 30 shows higher priority data transfer 25 and lower priority data transfer 26 and 27. As described above, data transfer 25 is a high priority transfer of video data from hard disk array 21 to graphics output device 22. Data transfer 26 and data transfer 27 are both lower priority data transfers to network adapter card 26 and from CD-ROM 24 respectively.

Diagram 30 shows how high priority data transfer 25, and low priority data transfers 26 and 27 each access the finite amount of data transfer bandwidth, represented by region 31, of hard disk array 21. The system of the present invention allocates a portion of data transfer bandwidth 31 to satisfy high priority data transfer 25. The remaining portion of data transfer bandwidth 31 is used to satisfy the low priority data transfers 26 and 27. Thus, the present invention ensures high priority data transfer 25 is not disturbed or otherwise adversely impacted by low priority data transfers 26 and 27. Low priority data transfers 26 and 27 share the remaining portion of data transfer bandwidth 31. In this manner, the present invention services the data transfer requirements of high priority data transfer 25 without shutting out low priority data transfers 26 and 27.

Figure 4:
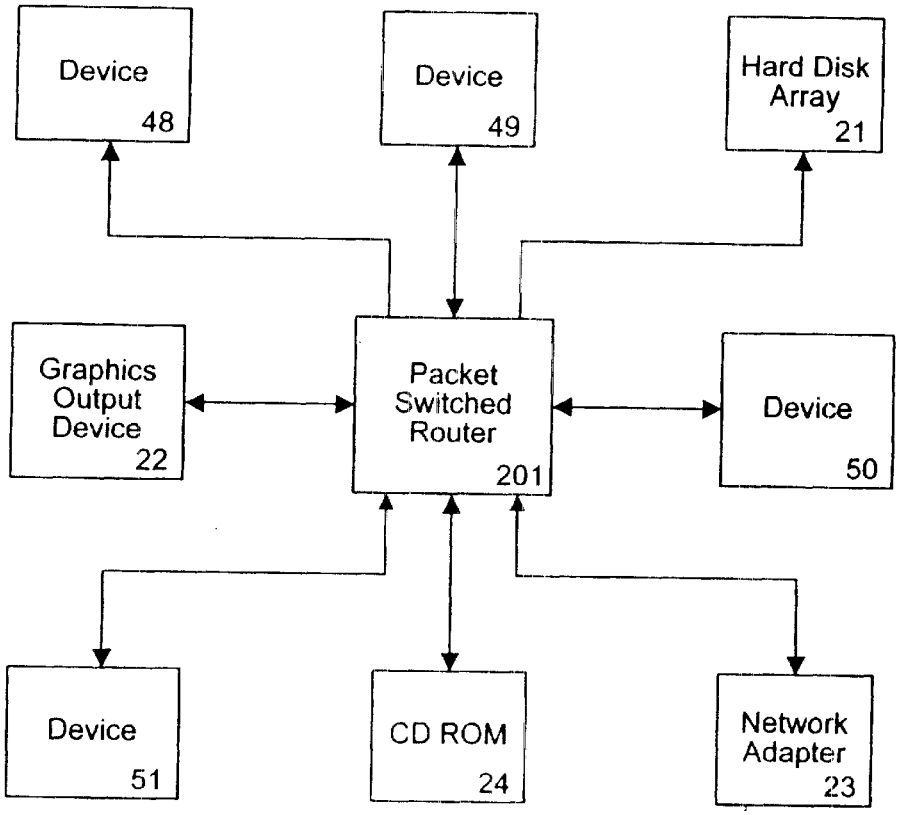
FIG. 4 shows a diagram of prioritized data transfer access using a packet switched router in accordance with the present invention.

FIG. 4 shows a diagram 40 of prioritized data transfer access using a packet switched router 201 in accordance with the present invention. The packet switched router 201 of the present invention is coupled to a plurality of peripheral devices (e.g., device 48, device 49, device 50, and device 51) along with hard disk array 21, graphics output device 22, network adapter card 23, and CD-ROM 24.

As described above, data is transferred between two devices coupled to packet switched router 201 in the form of individually addressed data packets. Thus, high priority data transfer 25 (shown in FIG. 3) involves the transfer of data packets from hard disk array 21 to graphics output device 22 via packet switched router 201. Similarly, low priority data transfers 26 and 27 involve the transfer of respective individual data packets from hard disk array 21 to network adapter card 23 and from CD-ROM 24 to hard disk array 21, via packet switched router 201. The hard disk array 21, in accordance with the present invention, communicates with the packet switched router by means of "request packets". These request packets are managed and manipulated in "packet request queues". These packet request queues are organized to facilitate the prioritized communication process of the present invention. A similar set of packet request queues are coupled to each of the devices coupled to packet switched router 201 (e.g. hard disk array 21, graphics output device 22, Network adapter card 23, CD-ROM 24, and devices 48–51). The packet request queues temporarily stored the request packets as they are transferred by packet switched router 201. Each output port of the packet switched router has its own request queue. The packet switched router then arbitrates among the packets, determining which should be sent to the destination port first, and which should follow.

Figure 5:
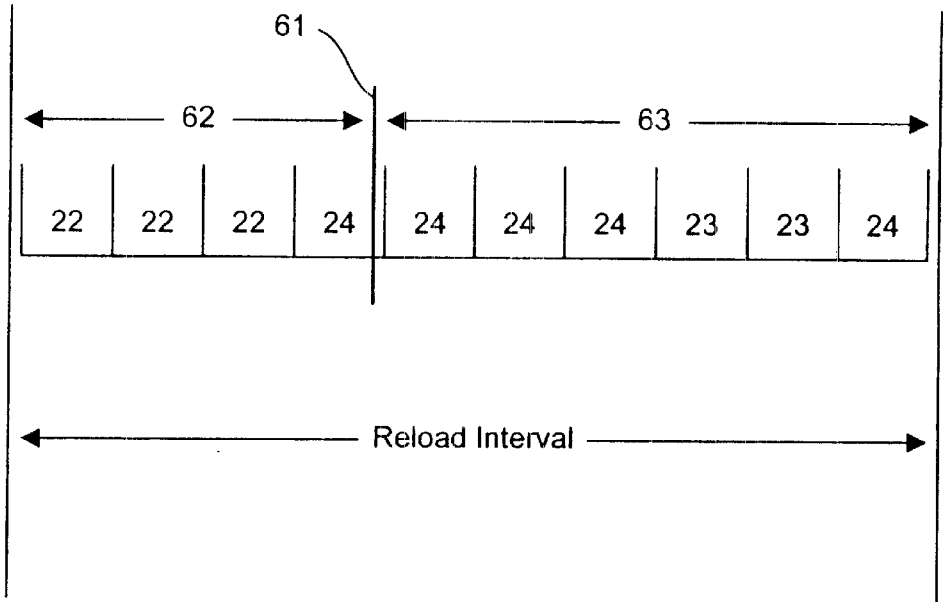
FIG. 5 shows a logic diagram of a portion of the ring buffer included in the hard disk array in accordance with one embodiment of the present invention.

FIG. 5 shows a diagram of a set of request packets intended for transfer to a particular device (e.g. the hard disk array 21) in accordance with one embodiment of the present invention. The set of request packets 60 comprises a "reload interval", which is a unit of time over which the packet switched router manages the flow of request packets. For example, request packets from graphics 22, Network adapt card 24, and CD-ROM 23 might all be destined for transmission to the hard disk array 21 within a single reload interval.

In the present embodiment, each request packet may be up to one cache line long (i.e. 128 bytes). As individual request packets are received by the packet switched router, and routed for delivery to a particular device (e.g. the hard disk array 21) the packet switched router "arbitrates" among these packets to select their order of delivery.

Line 61 represents a division of the reload interval 60 into two logical components: a high priority portion 62, and a remainder portion 63. As shown in FIG. 5, 40% of the reload interval has been allocated for high priority transfer, and 60% of the reload interval has been allocated for all other transfers. Thus, for every reload interval, 40% of the available bandwidth for that interval may be used for high priority traffic, while 60% of the available bandwidth is used for all other traffic.

It should be appreciated that although portion 62 is allocated to high priority data packets 22, portion 62 is not "reserved" for high priority data packets 22. Thus, if there are not enough high priority data packets 22 to fill portion 62 during a reload interval, the remaining entries of portion 22 are filled with any lower priority data packet awaiting input or output (e.g., data packet 24). In this manner, the present invention ensures high priority data transfers are not hindered by lower priority data transfers while simultaneously ensuring data transfer bandwidth is not wasted.

Similarly, it should be appreciated that although portion 63 is allocated for "non-priority" packets, it is not "reserved" for non-priority packets. Thus, if there are more high priority packets that can be sent in the high-priority portion of the reload interval, these high-priority may be sent using slots allocated for "non-priority" requests. The packet switched router arbitrates between these "excess" high-priority packets and all other packets using an arbitration scheme. In this manner, the present invention ensures data transfer bandwidth is not wasted, even in cases where instaneous data traffic patterns do not match the configured division between priority transfers 62 and non-priority transfers 63.

In addition, it should be noted that the present invention retains the entries of portion 63 for lower priority data transfers (e.g., low priority data packets 24 and 23. The bandwidth of portion 63 is allocated among lower priority data packets using an arbitration scheme. The lower priority data packets share portion 63 and any unused entries of portion 62 to satisfy their respective data transfer bandwidth needs. In this manner, the present invention ensures lower priority processes are not shut out or otherwise starved for data transfer bandwidth.

It should be appreciated that the number of bits per data packet, the number of data packets per reload interval, and other such details are implementation specific. As such, the system of the present invention is well suited to the utilization of differing implementation specific details (e.g., the size of the high priority bandwidth allocation portion 62 being 60% as opposed to 40%).

The overall bandwidth allocation process is managed by an operating system in accordance with the present invention. The high priority bandwidth portion 62 is sized and allocated in response to requests from software applications (i.e., software processes) running in conjunction with the operating system. High priority software applications request a high priority bandwidth allocation from the operating system, as discussed below.

In the operating system in accordance with one implementation of the present invention, a kernel bandwidth allocator is the central module responsible for handling and keeping track of bandwidth allocation requests. Primary users of the services provided by the kernel bandwidth allocator are the software drivers for the devices coupled to the packet switched router 201 and the file system of the operating system. User-level kernel bandwidth allocator requests from software processes are converted to one of the above via a priority I/O API (application program interface) call to the operating system.

The software device drivers which need to set up a priority bandwidth allocation call the kernel bandwidth allocator with the current user requested bandwidth, the bandwidth to be actually allocated, and information describing the origin and destination of the data transfer. Given this information in the priority bandwidth allocation call, the kernel bandwidth allocator determines a "path" in the hardware of the computer system (e.g., a data transfer path from the source device, via the port coupled to the source device, via the packet switched router 201, via the port coupled to the destination device, to the destination device). The kernel bandwidth allocator subsequently "walks" this path, trying to allocate the bandwidth at each vertex, or node, along on the path. If bandwidth allocation fails at any node, the path traversal stops, the bandwidth allocated so far along the path is revoked, and an error is returned to the user (e.g., the software process) requesting the priority bandwidth allocation. Only if bandwidth allocation succeeds at each node along the path does the kernel bandwidth allocator return successfully. The allocator keeps track of current bandwidth allocation by maintaining an internal table.

The kernel bandwidth allocator might also maintains a global bandwidth allocation lock which can be used by software applications to "atomically" allocate/deallocate bandwidth for multiple data paths. Subsequent priority bandwidth allocation request are rejected when this lock is held, and the process identifier of the software process holding the lock is returned instead.

When a software process sets up a new priority bandwidth allocation, an exit callback function is registered which ensures the priority bandwidth allocations for that software process are removed if the process terminates abnormally. If the software process completes without releasing the global bandwidth allocation lock, the lock is released by the operating system. This function is typically registered only once per requesting process. During system setup, bandwidth allocation function pointers (which have specific knowledge about doing bandwidth allocations for that particular piece of hardware) are stored at relevant nodes in the path. These functions are invoked during the path traversal stage of the priority bandwidth allocation process for each node.

Figure 6A:
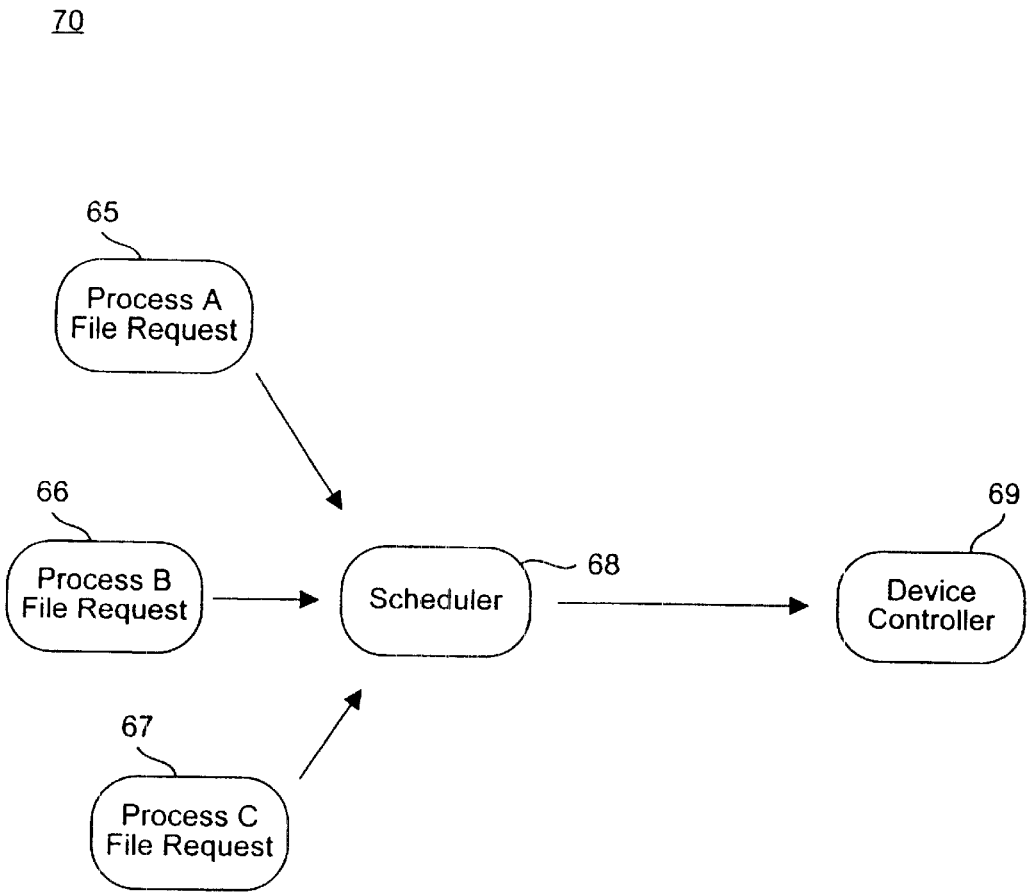
FIG. 6A shows a diagram of a priority scheduling process in accordance with the present invention.

Referring now to FIG. 6A, a diagram 70 showing a priority scheduling process in accordance with the present invention is shown. Diagram 70 shows the priority scheduling processes utilized by a peripheral device coupled to the packet switched router 201. (e.g., hard disk array 21). Diagram 70 includes a software process A file request 65, a software process B file request 66, and a software process C file request 67. Each of these file requests 65–67 comprise requests from software processes executing on the computer system for specific files stored on hard disk array 21. Each of these file requests 65–67 are waiting to be served by the device driver 68. Each of these file requests are processed by a device driver 68, which, in turn, issues appropriate corresponding commands to a device controller 69.

The present invention utilizes priority scheduling in addition to priority bandwidth allocation to efficiently perform data transfers. The device driver 68 schedules the file requests 65–67 by sending appropriate commands to the device controller 69 to read the requested file from the hard disk 21 (from FIG. 4). In accordance with the priority scheduling process of the present invention, the device driver 68 executes higher priority file requests before executing lower priority file requests. Where process A file request 65 is a higher priority file request (e.g., a request for the next frame of video data for a video) and process B and process C file requests 66–67 are lower priority file requests, the device driver 68 serves the higher priority process A file request 65 prior to serving the lower priority file requests 66 and 67.

Figure 6B:
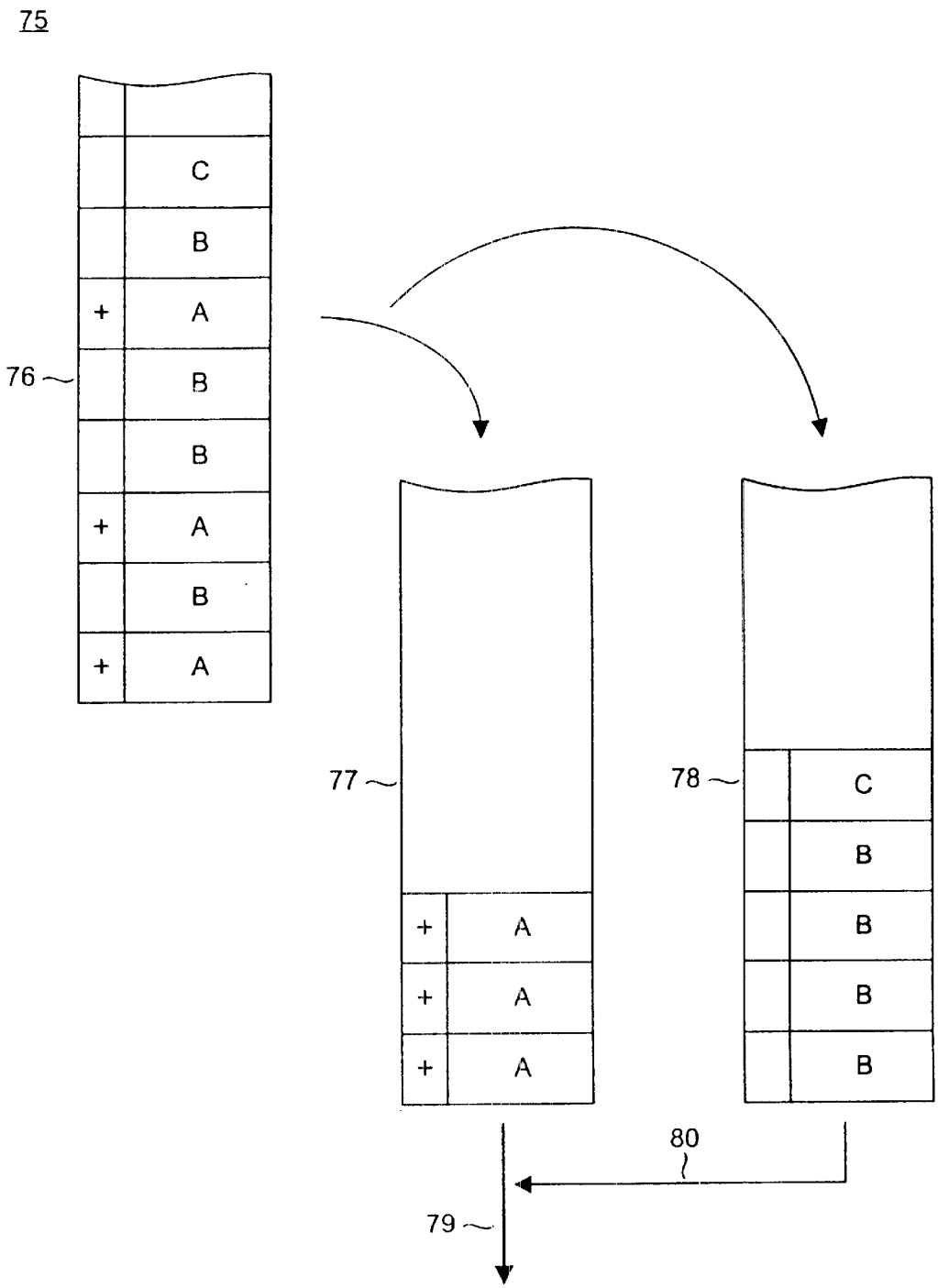
FIG. 6B shows a diagram of the priority scheduling process of a device driver in accordance with the present invention.

FIG. 6B shows a diagram 75 the priority scheduling process of the device driver 68. In one implementation, buffer 76 stores new file requests as they are received from software processes running on the computer system. Buffer 76 stores file requests from process A, file request from process B and file requests from process C. The process A file requests stored in buffer 76 are high priority file requests. The priority information is stored in a file descriptor accompanying each file request. The priority scheduling process of the present invention utilizes the information contained in the file descriptors to schedule the file requests for service. The higher priority file requests will have an appropriate high priority designation in their respective file descriptors. In diagram 75, the high priority designation is shown as a "0" character. Thus, in the present embodiment, the high priority file requests are transferred to a high priority buffer 77 and the lower priority file requests are transferred to buffer 78. The file requests in high priority buffer 77 are subsequently served by the device driver 68 (as represented by line 79) prior to the file requests in buffer 78 (as represented by line 80). In so doing, high priority file requests are "pushed" to the "front" of the queue.

In this manner, the priority scheduling process of the present invention schedules high priority data transfers (e.g., input or output for a high priority software application) to be serviced by computer system resources prior to lower priority data transfers. Requests for access to computer system resources (e.g., hard disk 21) by high priority software applications, in accordance with the priority scheduling process, are pushed to the front of the queue. The priority-scheduling process is used in conjunction with the priority data transfer bandwidth allocation process of the present invention. Hence, in addition to allocating data transfer bandwidth for high priority software applications, the present invention pushes high priority requests to the front of each peripheral device's queue.

The priority scheduling process of the present invention thus provides efficiency benefits for computer systems which are not equipped with hardware supporting priority data transfer bandwidth allocation (e.g., packet switched router 201 from FIG. 4). High priority requests are still pushed to the front of each peripheral device's queue. Hence, high priority software applications running on such a computer system are benefited by the priority scheduling process in even though bandwidth allocation is not supported.

It should be appreciated that while in the present embodiment three separate buffers (i.e., buffer 76, buffer 77, and buffer 78) are shown, the priority scheduling process of the present invention is readily adapted to different hardware configurations for implementing a multilevel priority system. In addition, while diagram 75 shows two priority levels (i.e., high priority level requests stored in buffer 77 and lower priority requests stored in buffer 78), the priority scheduling process of the present invention can support three or more levels of priority.

Figure 6C:
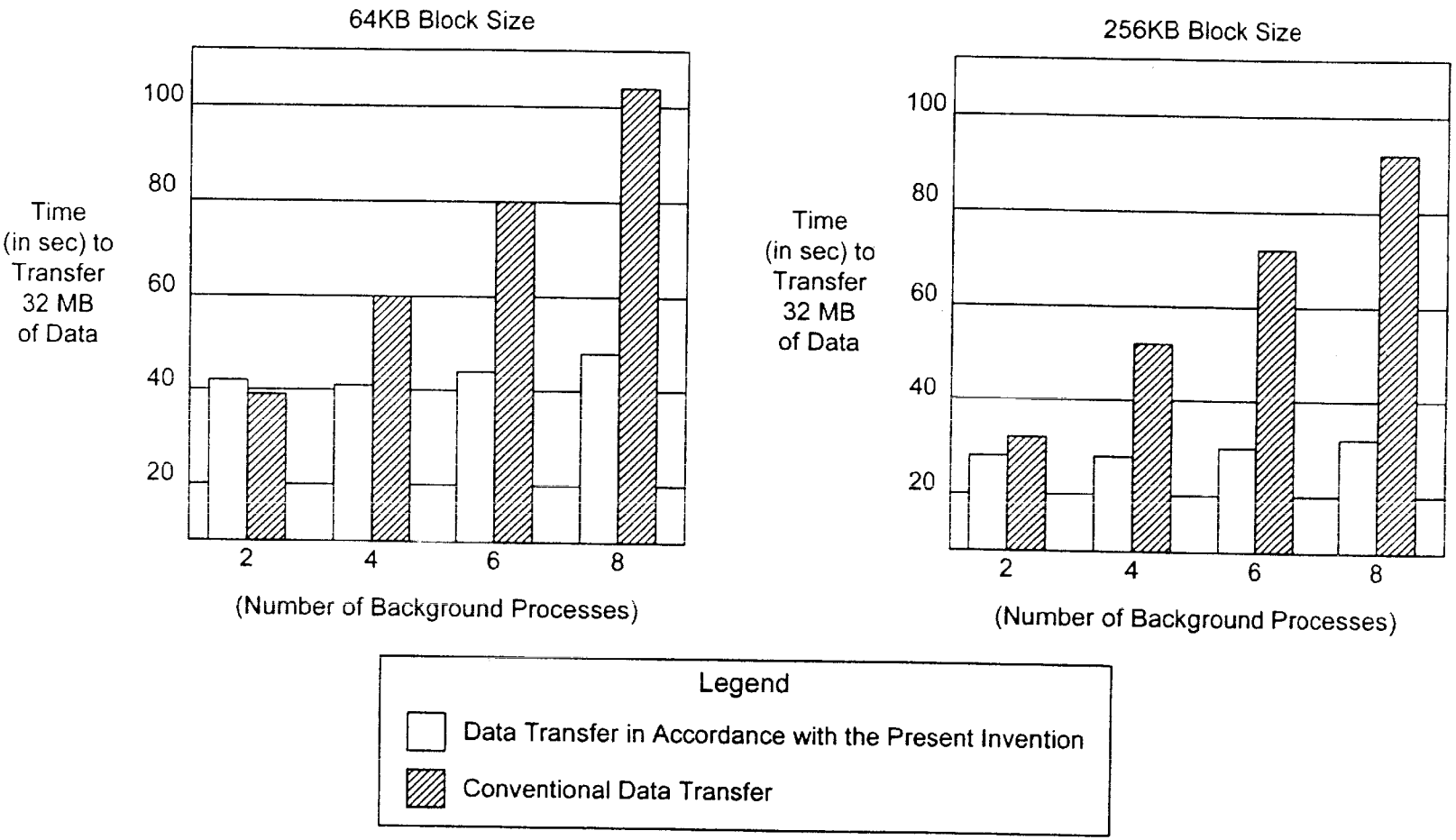
FIG. 6C shows a 64 KB data transfer graph, a 256 KB data transfer graph, and a corresponding legend that shows the amount of time required to complete a typical data transfer using a process in accordance with one embodiment of the present invention.

FIG. 6C shows a 64 KB data transfer graph, a 256 KB data transfer graph, and a legend. The 64 KB data transfer graph shows time required for a high priority software process to complete a 32 MB transfer, moving data in 64 KB blocks in the vertical direction and the number of processes executing simultaneous data transfers in the horizontal direction. Hence, in accordance with the legend, 64 KB data transfer graph shows a bar representing the amount of time required for a high priority process to transfer 32 MB of data using the present invention and a bar representing the amount of time required for the same high priority process to transfer 32 MB of data using conventional data transfer methods. The bars are shown for two background (i.e., lower priority) processes, four background processes, six background processes, and eight background processes.

Thus, the 64 KB graph shows that with 2 low priority processes executing simultaneous data transfers, a high priority process using the present invention (e.g., the bandwidth allocation and priority scheduling processes) requires slightly more time to transfer 32 MB than conventional transfer method. This is due to the fact that the software code implementing the present invention adds a small amount of "overhead" to the computer system. However, when the number of low priority processes are increased to four, the present invention allows the high priority software process to transfer the 32 KB block of data significantly faster than the conventional method. As the number of background processes increase to six and eight, the efficiency advantages provided by the present invention greatly increase. The bandwidth allocation and the prioritized scheduling processes of the present invention maintain a nearly constant level of performance in transferring the high priority 32 MB, while the performance using the conventional method greatly deteriorates.

Referring now to the 256 KB graph, the displayed items are similar but for the size of the high priority data transfer, wherein a 32 MB data block is being transferred by the high priority software process in blocks of 256 KB as opposed to blocks of 64 KB. The 256 KB graph shows that even though the size of each data transfer is increased, the advantages provided by the present invention are even greater. In addition, it should be noted that with two low priority processes, since the size of each data transfer is larger (i.e., 256 KB instead of 64 KB), the high priority software process using the present invention requires slightly less time to transfer 32 MB than conventional transfer method, regardless of the added amount of overhead.

Figure 7:
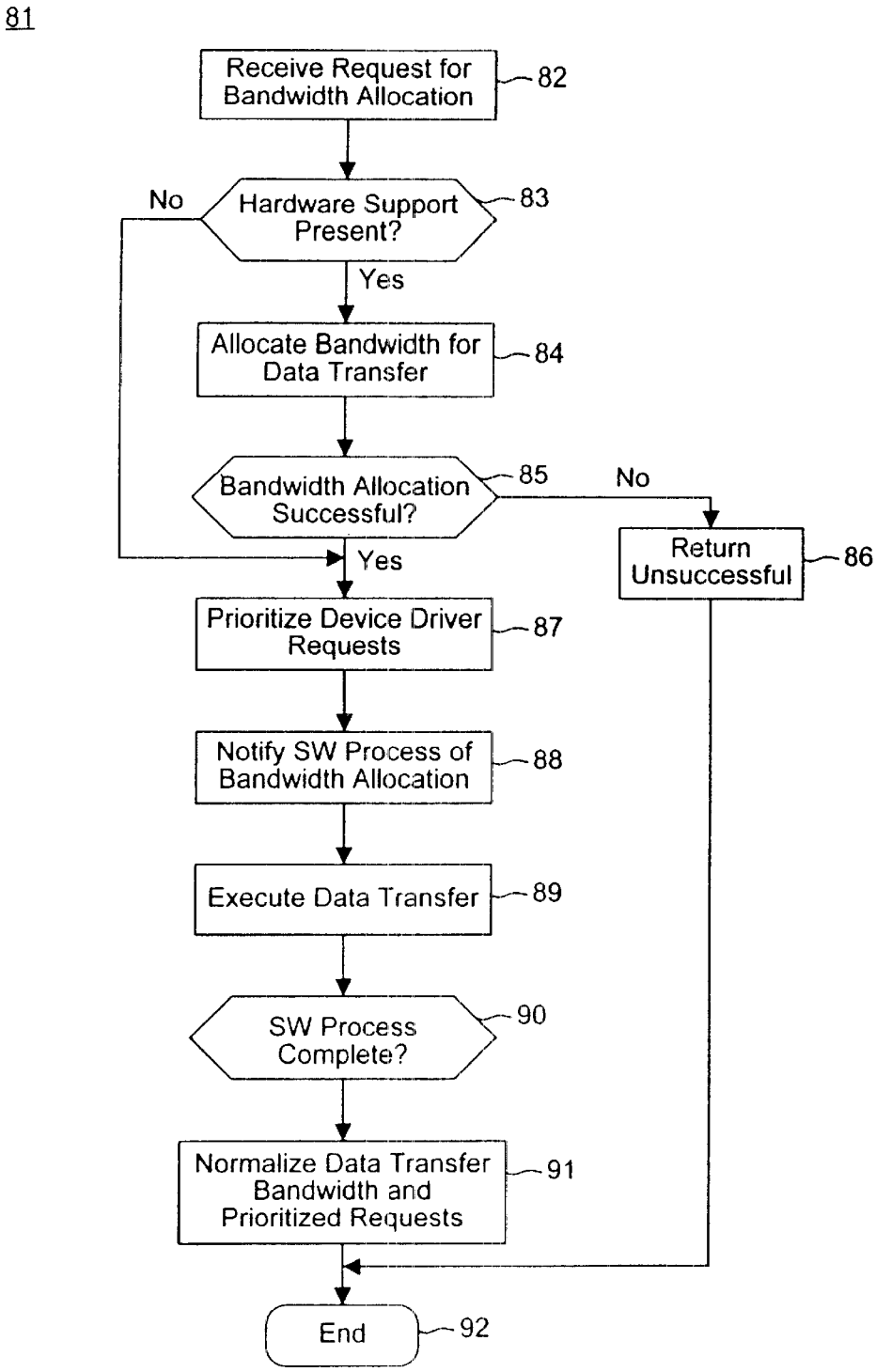
FIG. 7 shows a flow chart of the steps of a process in accordance with one embodiment of the present invention.

FIG. 7 shows a flow chart 81 of the steps of a process in accordance with one embodiment of the present invention. In step 82, the process of the present invention receives a request from a software process running on the computer system for a high priority bandwidth allocation. The user level bandwidth allocation request is converted to a software device driver request, in the manner described above. The software device driver calls the kernel bandwidth allocator with the current user requested bandwidth, the bandwidth to be actually allocated, and information describing the origin and destination devices of the data transfer.

In step 83, the present invention determines whether there is hardware support for the high priority bandwidth allocation. The kernel bandwidth allocator determines a path in the hardware of the computer system between the originating device and the destination device, as described above. If the hardware supporting bandwidth allocation is not present, the bandwidth allocation process is aborted and the process proceeds to step 87. If the hardware supporting bandwidth allocation is present, the process proceeds to step 84.

In step 84, the kernel bandwidth allocator walks along the nodes of the path between the originating device and the destination device, trying to allocate bandwidth at each node, as described above. In step 84, if the bandwidth allocation was successful at each node, the process proceeds to step 87. If the bandwidth allocation was unsuccessful, however, the process proceeds to step 86 where the kernel bandwidth allocator returns an unsuccessful notification to the software device driver. From step 86, the process proceeds to step 92 and ends.

In step 87, the priority scheduling process of the present invention pushes high priority requests in the software device driver to the front of their respective queues, in the manner described above. If the hardware supporting bandwidth allocation is not present, the priority scheduling process still prioritizes the high priority requests (e.g., pushes high priority requests to the front of their respective queues). In step 88, the kernel bandwidth allocator notifies the software driver the bandwidth allocation process is complete. If bandwidth was allocated in step 84, the software process originally requesting the bandwidth allocation is guaranteed the allocated bandwidth for its data transfers. If bandwidth was not allocated in step 84 (i.e., no hardware support), the software process is notified its access requests will be prioritized.

In step 89, high priority data transfers of the software process are executed via the hardware of the computer system. As described above, these high priority data transfers occur without being disturbed or disrupted by lower priority data transfers. Additionally, the higher priority data transfers are executed without shutting out the lower priority data transfers. In step 90, the high priority software process (e.g., a full motion video player) runs on the computer system, utilizing its allocated data transfer bandwidth for its data transfer requirements. In step 91, when the high priority software process is complete, the process of the present invention "normalizes" the allocated data transfer bandwidth and the prioritized requests of the software process. The allocated data transfer bandwidth is released and the access requests of the software process are no longer prioritized. The process of the present invention subsequently ends in step 92.

Thus, the present invention provides a method and system for prioritized communication in a computer system. The system of the present invention services the bandwidth requirements of the above high priority applications without shutting out requests from lower priority applications. In so doing, the system of the present invention accommodates the critical real-time data requirements of digital video, digital audio, 3D graphics, real-time compression and decompression applications, and the like. In addition, the present invention provides communications efficiency benefits in computer systems which do not provide specific hardware support for prioritized peer to peer communication. Hence, the present invention provides advantageous benefits to older applications and computer systems. The specific hardware implementation details of the packet switched router 201 of the present invention are described in greater detail in the section below.

Figure 8:
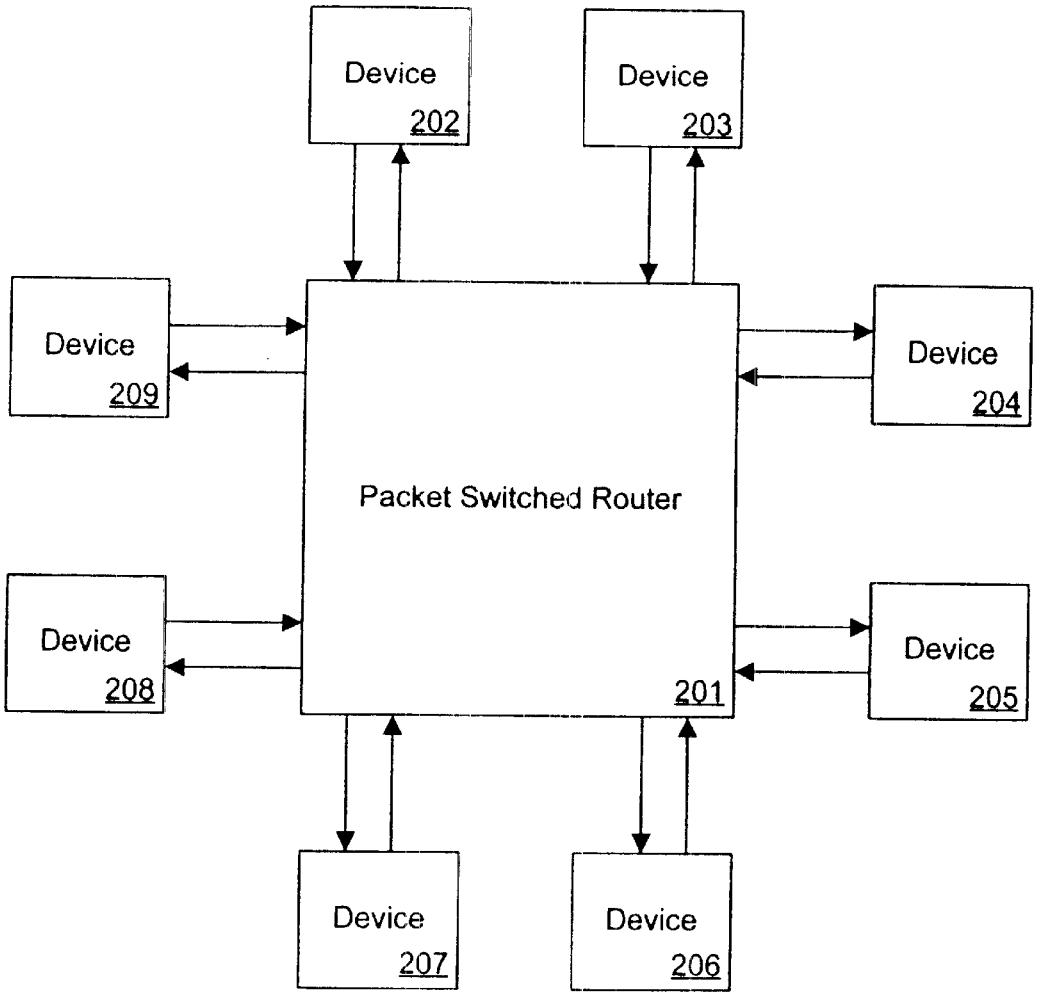
FIG. 8 shows a block diagram of one embodiment of the packet switched router architecture of the present invention.

FIG. 8 shows a block diagram of one embodiment of the packet switched router architecture according to the present invention. Multiple devices 202–209 are connected to a central packet switched router 201. Devices 202–209 may include subsystems (e.g., graphics, audio, video, memory, etc.), printed circuit boards, single semiconductor chips of chipsets (e.g., RAM, ASICs, CPU's, DSP's, etc.), and various other components (e.g., I/O devices, bridges, controllers, interfaces, PCI devices, etc.). Each of the devices 202–209 has its own dedicated transceiver for transmitting and receiving digital data. Eight such devices 202–209 are shown. Also as shown, packet switched router 201 has eight ports for interfacing with each of the eight devices 202–209. In the present embodiment, each port has the ability to operate as either a 16-bit or 8-bit port. However ports may be wider than 16 bits or narrower than 8 bits. Each port uses two links: one for transmit (source link) and one to receive (destination link). However, the system is scalable so that it can handle more or less devices. By adding more ports, additional devices may be incorporated into the computer system via the packet switched router 201. Each of these devices 202–209 has its own dedicated link. A link is defined as the physical connection from the packet switched router 201 to any of the devices 202–209. A link may be unidirectional or bi-directional. However, the currently preferred embodiment entails implementing point-to-point unidirectional connections in order to provide a controlled impedance transmission line. The data rate on each link is 400 MHz (2 bytes*400 MHz=800 megabytes per second in each direction =1.6 gigabytes per second per port).

Switched packet router 201 can be commanded to establish a link between any two designated devices. Thereupon, a source device may transmit its packet of data to the destination device via the link. Immediately after the packet is sent, a new link may be established and the source device may initiate transfer of another packet to a different destination device. Concurrently, a different source device may transmit its data packet over a separate link to its intended destination device. For example, device 202 can be linked to device 203. Device 202 transmits a packet to device 203. Later, packet switched router 201 can be commanded to establish a dedicated link between device 202 and device 203. A packet can then be transmitted from device 202 to 203. Basically, device 202 is capable of being linked to any of the other devices 203–209 coupled to packet switched router 201. In the present invention, one or more links may be established at any given time. For instance, a first link may be established between devices 202 and 209 while, simultaneously, a second link may be established between devices 203 and 205. Thereby, device 202 may transmit a packet to device 209. At the same time, device 203 may transmit its packet to device 205. With eight devices, there may be up to eight separate packet transmissions going at the same time. An additional 1.6 Gigabytes per second of bandwidth is achieved simply by establishing a second link. Hence, with the present invention, bandwidth is increased to the desired degree merely by establishing additional links. Thus, instead of having a shared bus scheme with only one communication over a shared party line, the present invention utilizes a packet switched routing architecture to establish multiple links so that multiple data packets can be conveyed concurrently.

Figure 9:
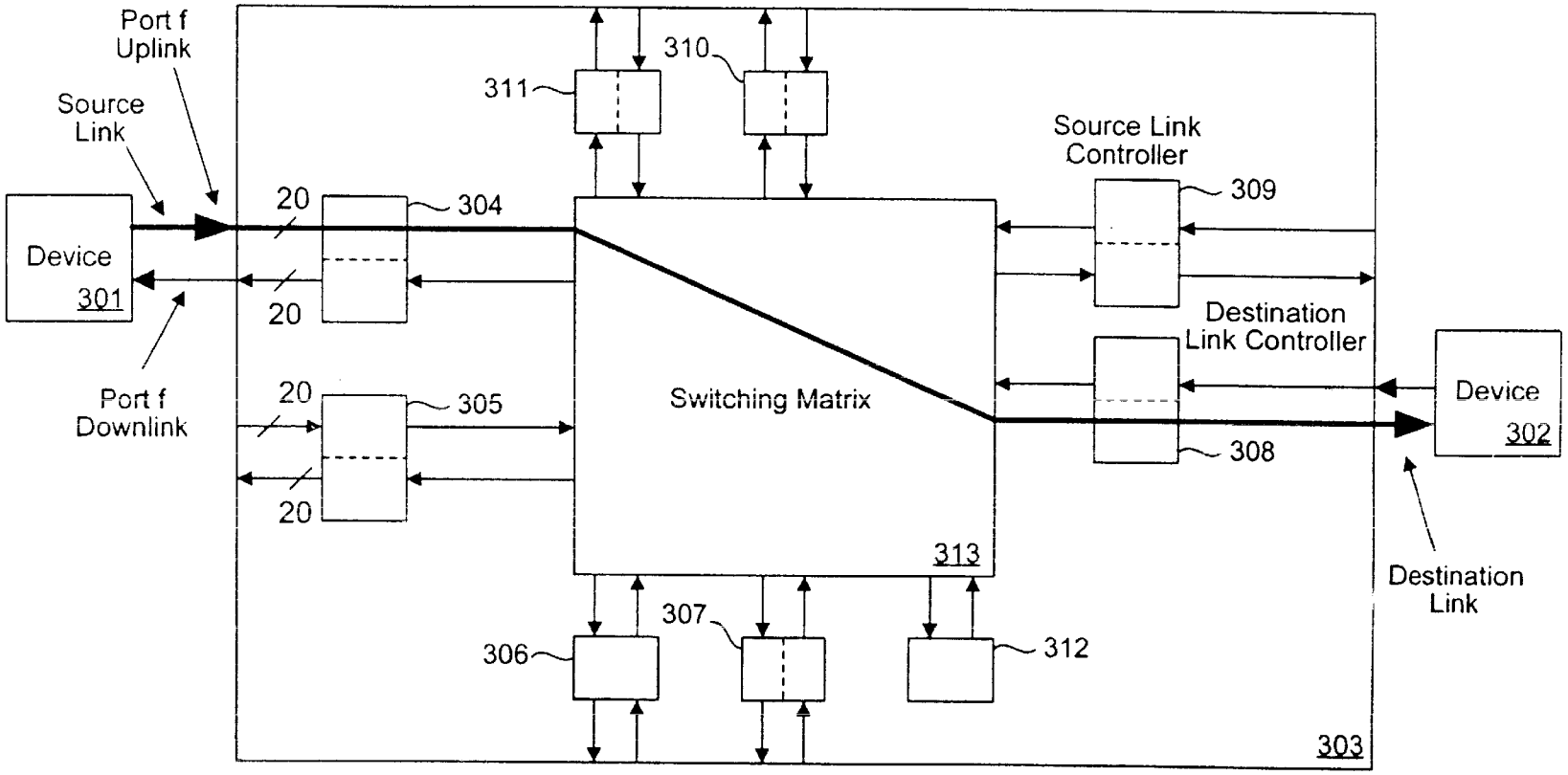
FIG. 9 shows a more detailed diagram of the fundamental blocks associated with the packet switched router of the present invention.

FIG. 9 shows a more detailed diagram of the fundamental blocks associated with the packet switched router. The currently preferred implementation of the architecture employs a high-speed, packet-switched protocol. A packet of data refers to a minimum unit of data transfer over one of the links. Packets can be one of several fixed sizes ranging from a double word (e.g., 8 bytes) to a full cache line (i.e., 128 bytes) plus a header. The data packets are transmitted source synchronous (i.e., the clock signal is sent with the data) at rates of up to 800 Mbytes/sec for 16-bit links and up to 400 Mbytes/sec for 8-bit links. Split transactions are used to transmit data, whereby an initiator device 301 sends a request packet (e.g., read command or write command plus data) to a target device 302 which then replies with a response packet (e.g., read data or optionally a write acknowledgment). The packet switched router 303 performs the functions of a switching matrix. The device 301 desiring to transfer a packet to another device 302, first transfers the packet to its associated input packet buffer. Once the packet routing information has been correctly received, arbitration begins for the destination port resource 308. The packet is then stored until the corresponding source link controller 304 can successfully obtain access to the destination port resource 308. As soon as access is granted, the packet is transferred through the switching matrix 313 to the destination port resource 308, and is subsequently transferred to target device 302.

Hence, the major functional blocks corresponding to the packet switched router 303 include link controllers 304–311, an internal interface 312, and the switching matrix 313. The link controllers 304–311 handle all packet transfers on the link port between a device and the packet switched router. The link controllers 304–311 are comprised of two sub-blocks: the source link controller and the destination link controller. The source link controller controls all packet movement from a source link to the internal crossbar switch 313. Conversely, a destination link controller controls all packet movement from the packet switched router to the destination link. The switched router 313 is a nine port switch which connects the source link controllers to the destination link controllers. Additionally, one port on the switched router 313 is reserved for the internal interface 312. Internal interface 312 contains the interface to all registers internal to the packet switched router 303 and also functions in conjunction with the link controllers during error handling. Each of these major blocks are described in detail below.

Figure 10:
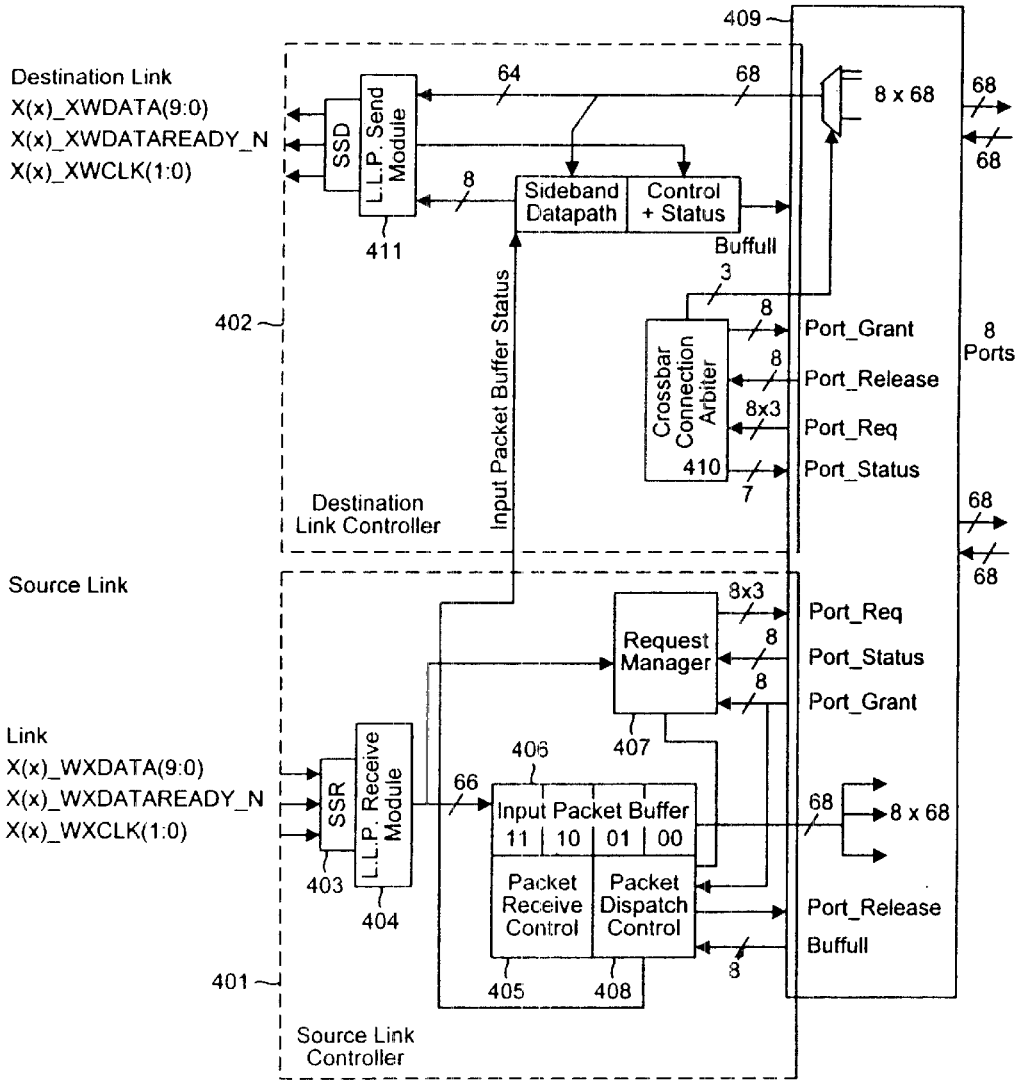
FIG. 10 shows a detailed circuit diagram of a link controller of the present invention.

FIG. 10 shows a detailed circuit diagram of a link controller. The link controller is divided into two sections, a source link controller 401 and a destination link controller 402. The source link controller 401 handles all traffic between the source link and the switching matrix 403. Packets are transferred on the source link and the data is received by the source synchronous receiver (SSR) 403 and link level protocol (LLP) receive module 404. The data is transferred in micropackets to ensure error-free transmission. Each micropacket contains 128 bits of data, 16 check bits, 4 bits of transmit sequence number, 4 bits of receive sequence number, and 8 bits of side band information. The SSR 403 receives the narrow, 400 MHz data stream and transmitted clock. It uses the clock signal to convert the data stream back into a wide, 100 MHz data stream. Hence, the majority of the packet switched router logic is isolated from the high speed links and operates at a 100 MHz core clock frequency. The LLP module regenerates the error check bits from the received data and compares them to the received check bits to ensure that no errors have occurred. The function of the LLP receive module 404 is to isolate the upper levels of logic in the link controller from the link level protocol. Basically, the SSR 403 and LLP receiver module 404 strips all link protocol information and passes the data to the next stages of logic.

Next, the packet receive control logic 405 scans the side band data for a "start of packet" code. If this code is received, the control logic 405 begins filling one of the 4-input packet buffers 406. The input packet buffers 406 serve two purposes. First, it provides a place to temporarily store a packet when the packet destination is busy. And second, it provides for rate matching between the data stream coming from the LLP and the switching matrix. The packet receive control logic 405 also extracts pertinent information from the command word portions of the packet and places it in the request queue, which is located in the request manager 407. The information written into the request queue defines the packet's destination, priority, and type (i.e., request or response). It is the task of the request manager to determine which packets are eligible for arbitration. While the packet is being received and put into one of the input packet buffers 406, the request manager 407 checks the status of the destination port and the priority of the packets in the queue to determine which of the packets in the input packet buffer 406 has the highest priority. If the packet which has just entered the queue has the highest priority of all packets currently in the queue, it will advance to the front of the queue and enter the arbitration phase. If there are higher priority connection requests already in the queue, it waits until those requests are serviced.

During the arbitration phase, the request manager 407 sends a connection request (port_req) to the destination link controller associated with that packet's destination. The request manager 407 then alerts the packet dispatch control 408 that a connection arbitration is in progress. When the packet wins arbitration, a $port_{13}$ grant signal is sent back from the destination link controller to the requesting source. Whereupon, the dispatch controller 408 begins transferring the packet out of the input packet buffer 406 and into the switching matrix 409. The request manager 407 then retires the entry from the request queue. As the dispatch controller 408 is transferring the packet, it also monitors whether the destination can currently accept any more data. When the transfer of the packet nears completion, the dispatch controller 408 releases control of the destination port by asserting the port_release signal. This releases the connection arbiter 410 to start a new arbitration phase and establish a new connection.

Referring still to FIG. 10, the destination link controller 402 handles all packet traffic between the switching matrix and the destination link. In addition, it controls all access to the destination port via the connection arbiter 410. The connection arbiter 410 is responsible for selecting from among all the source link controllers requesting to establish a connection to its destination port. The arbiter 410 scans all current port_req signals and sends a port_grant signal back to the selected link source controller. It then updates the status of the destination port (port_status). As the port_grant acknowledge is sent, the connection arbiter 410 also schedules switching the switching matrix to coincide with the first data arriving at the destination port from the source link controller. A new arbitration cycle begins when the arbiter 410 receives a port_release signal from the source link controller.

Data is streamed directly from the switching matrix to the LLP Send Module 411. The LLP Send Module 411 contains an internal buffer which is used to perform two functions. First, a portion of this buffer is used for supporting the LLP sliding window protocol. As data is transferred over the link, it is also written into the buffer. If receipt of the data is acknowledged by the receiver, the buffer locations are cleared. However, if an acknowledgment is not received, the data is retransmitted. In normal operation with packets being received correctly, only a portion of the buffer is used to support this protocol. Second, the remaining location in the buffer is used to rate match between the 800 Mbyte/sec switching matrix 409 and the 400 Mbyte/sec 8-bit links. This buffering allows a 16-bit source link controller or an 8-bit source link controller that has accumulated a full packet, to transfer at the full data rate to an 8-bit destination link. Thereby, the source link controller can then go service another destination while the transfer on the destination link is occurring.

A description of the internal interface is now presented. All access to internal registers in the packet switched router is performed via this internal interface. Devices requesting to modify these registers should direct their request packets to the internal interface destination. The internal interface functions much the same way as any set of link controllers. Source link controllers desiring to connect to the internal interface send a connection request to the internal interface. The arbiter within the internal interface sends an acknowledgment and then receives the packet. After the internal interface has received the packet it performs the appropriate operations on the packet switched router registers. If a response is required, the internal interface forms a response packet and transfers it back to the initiating device via the switching matrix.

Figure 11:
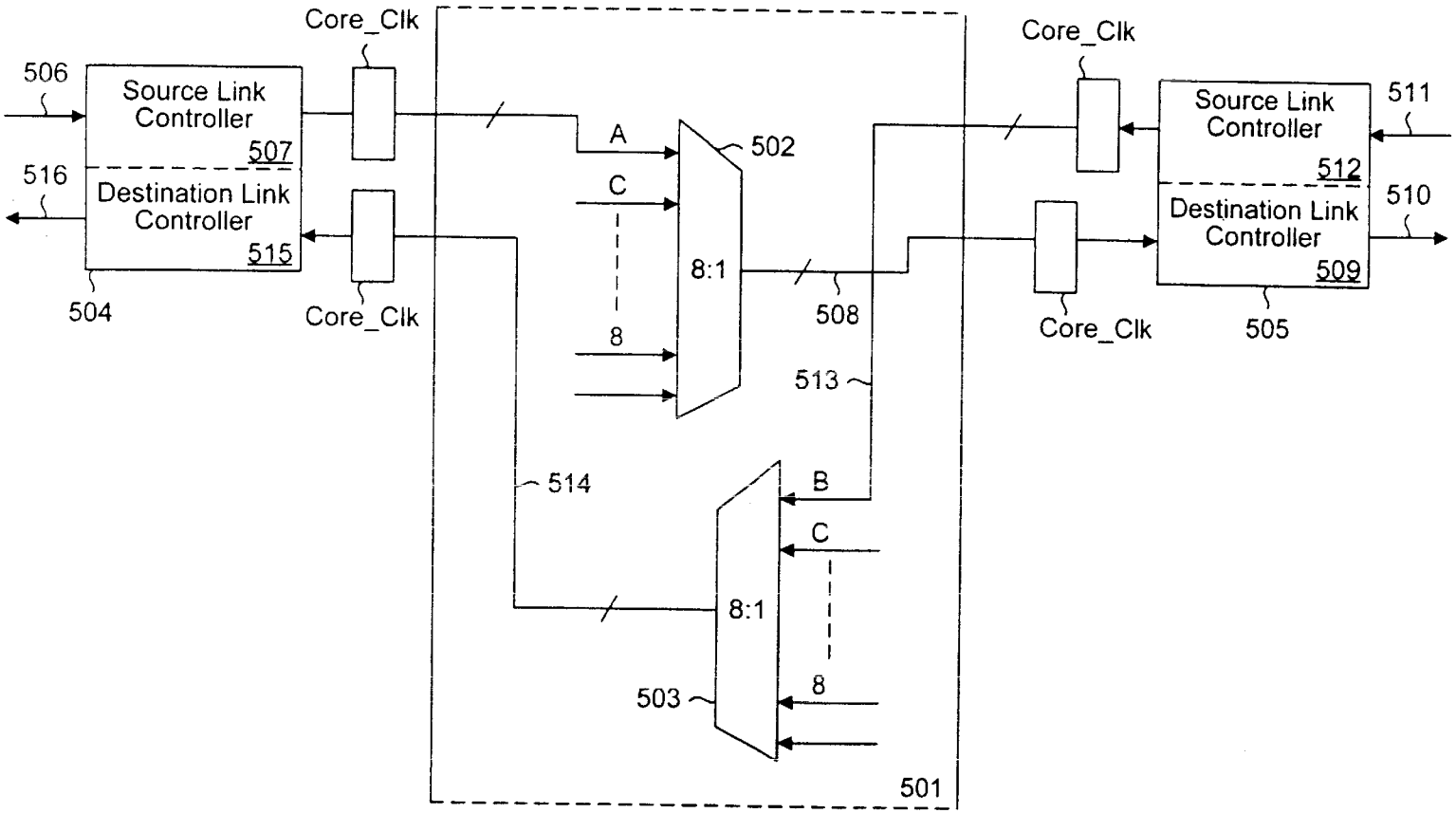
FIG. 11 shows a switching matrix of the preferred embodiment of the present invention.

There are many different circuit designs which may be used to implement the switching matrix. The currently preferred embodiment for the switching matrix is shown in FIG. 11. The switching matrix 501 is comprised of nine 68-bit wide 8:1 multiplexers. Any of the source ports can be connected concurrently to any of the destination ports. The switch interconnect is traversed by data in one core clock cycle. Hence, it is necessary for source link controllers to drive the switching matrix with registered outputs and for the destination link controllers to register the data in. For purposes of illustration, a pair of these multiplexers 502 and 503 are shown for connecting a first link controller 504 to a second link controller 505. Data received on link 506 is passed through the source link controller 507 to line 520 as an input to multiplexer 502. Multiplexer 502 is commanded to select the appropriate input line to be connected to the output line 508. This causes the data to eventually be input to the destination link controller 509 and out to a port on link 510. Likewise, data on link 511 is input to the source link controller 512. The data is then processed by the source link controller 512 and sent as a input on line 513 to multiplexer 503. Multiplexer 503 is commanded to select the appropriate input lines 513 and establish a connection to the appropriate lines 514 for input to the destination link controller 515. Thereby, the destination link controller 515 processes the received data and sends it out to the destination port via link 516. It should be noted that multiple sets of inputs from each of link controllers are input to each of the nine multiplexers. Thereby, each multiplexer can select which of these multiple inputs is to be connected to its destination link.

Figure 12:
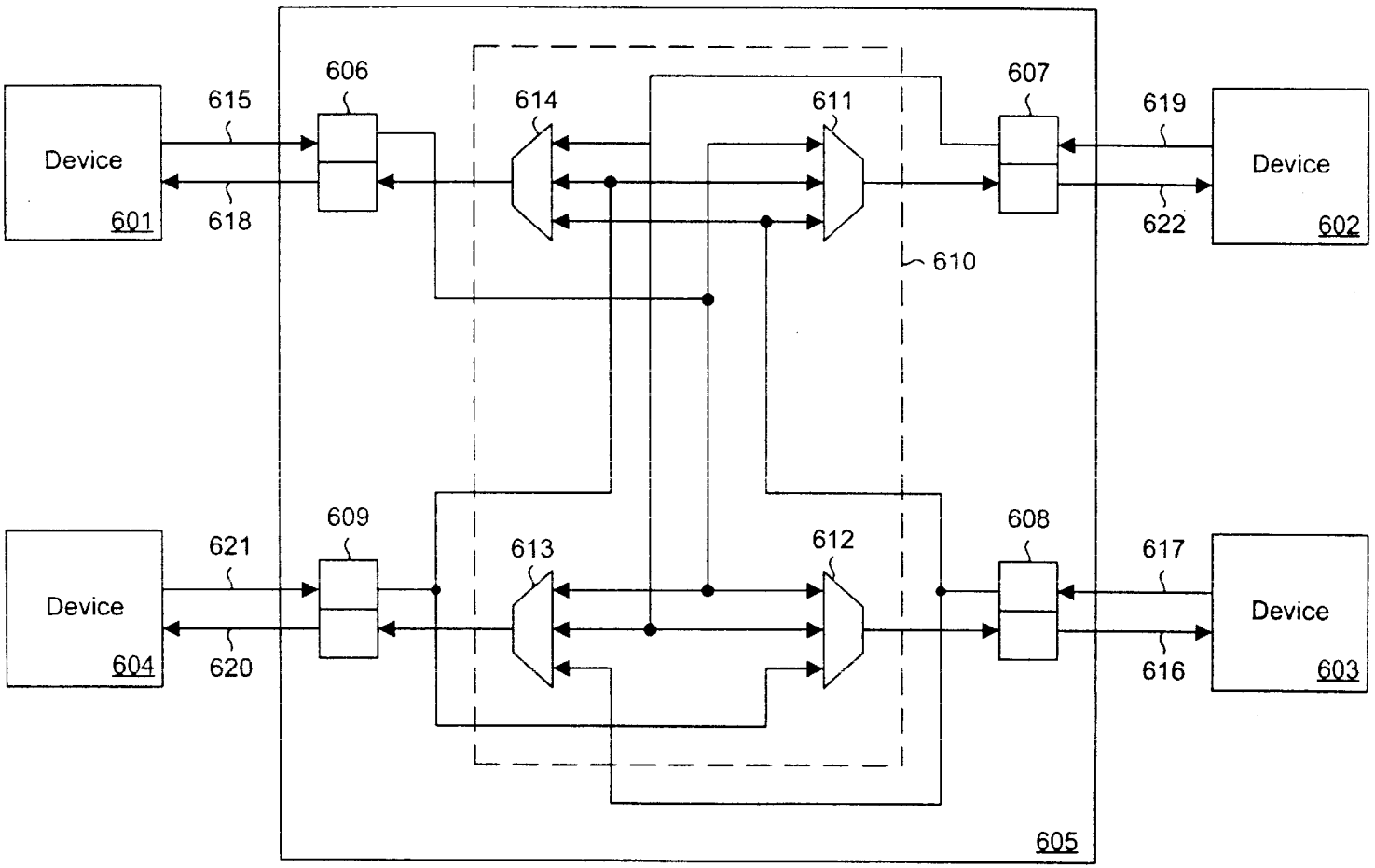
FIG. 12 shows an exemplary switched circuit for providing concurrent communications.

FIG. 12 shows an exemplary switched circuit for providing concurrent communications. Four separate devices 601–604 are coupled to the packet switched router 605 through four pairs of links. Switched packet router 605 is comprised of four link controllers 606–609 and switching matrix 610. Switching matrix 610 is comprised of four multiplexers 611–614. Each of the multiplexers 611–614 accepts inputs from three source links and outputs to one destination link. These multiplexers can be commanded so that connections may be established from one particular device to any of the other three devices. For example, the output link from device 601 can be connected to destination device 602 via multiplexer 611; destination device 603 via multiplexer 612; or destination device 604 via multiplexer 613. Likewise, the output link from device 603 can be connected to destination device 601 via multiplexer 614; destination device 602 via multiplexer 611; or destination device 604 via multiplexer 613.

In addition, pathways may be established to provide multiple concurrent packet transmissions. For example, device 602 may be connected to device 604 via multiplexer 613. And device 603 may be connected to device 601 via multiplexer 601. Thereby three separate packets of data may be transmitted concurrently: packet 1 from source device 601 to destination device 602, packet 2 from source device 602 to destination device 604, and packet 3 from source device 603 to destination device 601. In an alternative embodiment, connections may be established between a single source device and multiple destination devices. For example, device 601 may transmit data to both devices 603 and 604 simultaneously. Conversely, source devices 602, 603, and 604 may all send packets to 601. Arbitration is accomplished at link controller 606 for the multiple sources sending to device 601. Of course, the circuit can be scaled to accommodate additional devices by adding more links, link controllers, and multiplexers.

Figure 13:
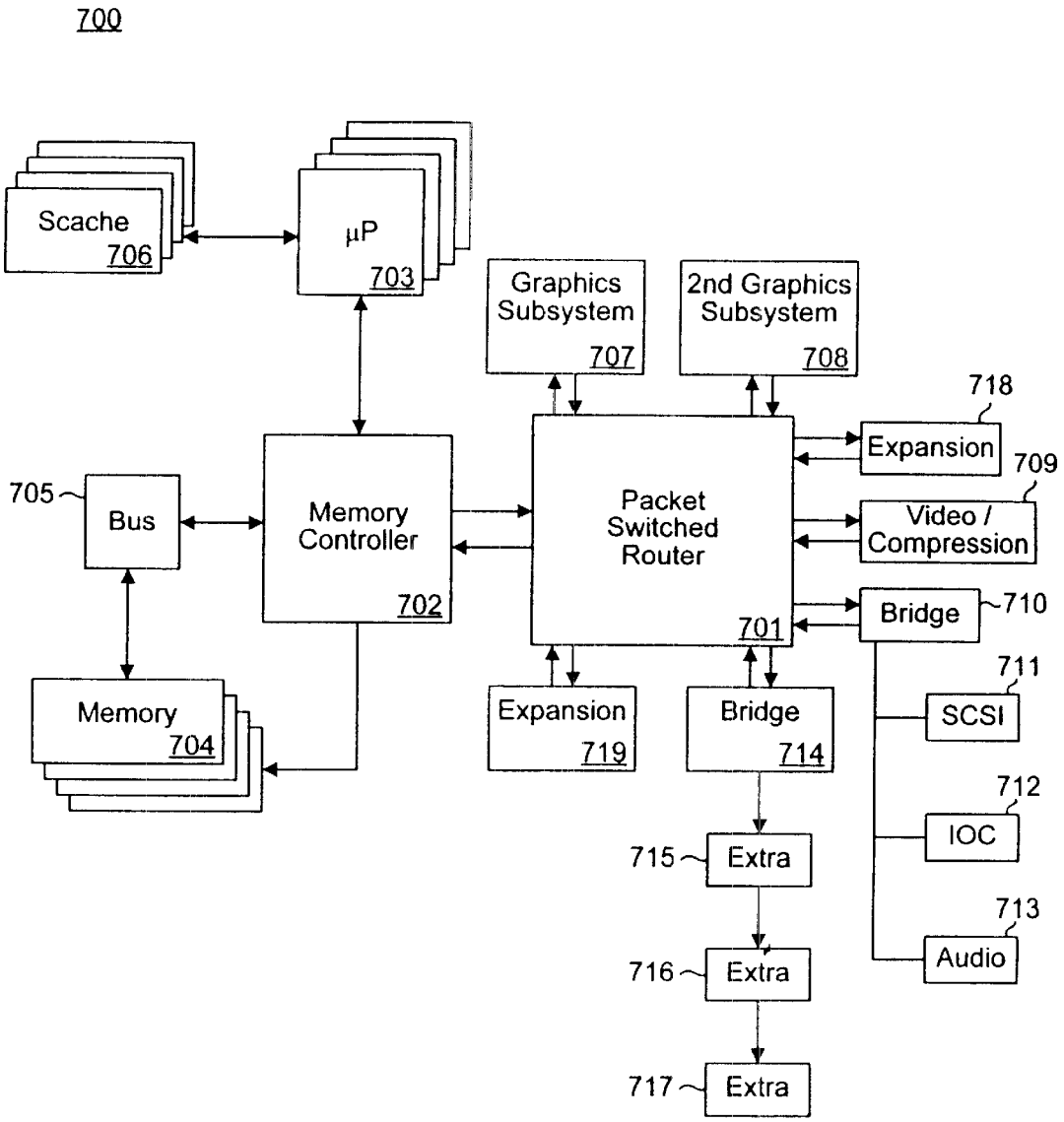
FIG. 13 shows one exemplary computer system incorporation the architecture of the present invention.

There are many different computer system configurations to which the packet switched router architecture of the present invention may be applied. One such exemplary computer system 700 is shown in FIG. 13. Switched packet router 701 has a pair of direct point-to-point connections to memory controller 702. Memory controller 702 facilitates the transfer of data between one or more microprocessors 703 and memory 704. A high-speed (e.g., 1 GBytes/sec) memory bus 705 is used to couple memory controller 702 with the actual memory 704. To improve performance, the mircoprocessors 703 may temporarily cache data in the cache 706. Other devices which may be connected to packet switched router 701 include one or more graphics subsystems 707–708. The graphics subsystems 707–708 perform functions such as scan conversion, texturing, anti-aliasing, etc. Furthermore, a video board 709 having compression/decompression capabilities can be connected to packet switched router 701. A bridge device 710 may also be connected to packet switched router 701. The bridge 710 acts as an interface so that various off-the-shelf PCI devices (e.g., graphics controller, modems, disk controller, etc.) may be coupled to the computer system via standard SCSI 711, IOC 712 and audio 713 ports. A second bridge 714 may be added to provide expansion PCI slots 715–717. Ports 718 and 719 are used to provide future growth and upgrade ability for the computer system.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. In a computer system having a microprocessor and a plurality of peripheral devices, a computer implemented method for implementing prioritized peer to peer communications, the method comprising the computer implemented steps of:

a) determining a first priority level;

b) determining a second priority level;

c) receiving a bandwidth allocation request from a software process to transfer data at said first priority level between a first plurality of devices coupled to a computer system;

d) allocating a first priority data transfer bandwidth between said first plurality of devices responsive to said bandwidth allocation request;

e) performing a first data transfer between said first plurality of devices using said first priority data transfer bandwidth;

f) performing a second data transfer between a second plurality of devices using a second priority data transfer bandwidth such that said second data transfer occurs at said second priority level;

g) ensuring said first data transfer is not disturbed by said second data transfer such that said first priority data transfer bandwidth for said software process is guaranteed; and h) removing said first priority data transfer bandwidth allocation when said software process terminates abnormally.

2. The method of claim 1 further including the step of prioritizing a queue for a device driver in at least one of said first plurality of devices such that a first sequence for access at said first priority level in said queue is serviced before a second request for access at said second priority level.

3. The method of claim 1 further including the step of removing said first priority data transfer bandwidth allocation when said software process is complete.

4. The method of claim 1 wherein step d) further includes the steps of:

locking said first priority data transfer bandwidth allocation; and rejecting a subsequent bandwidth allocation request from a subsequent software process.

5. The method of claim 4 further including the step of registering an exit call back function to remove said first priority data transfer bandwidth allocation lock when said software process terminates abnormally without removing said first priority data transfer bandwidth allocation lock.

6. The method of claim 1 further including the step of notifying said software process when said first priority bandwidth allocation cannot be completed.

7. The method of claim 1 wherein step c) further includes receiving an application programming interface call from said software process in a kernel bandwidth allocator to transfer said data at said first priority level.

8. The method of claim 7 further including the step of maintaining an internal table to track said first priority data transfer bandwidth in said kernel bandwidth allocator.

9. In a computer system having a microprocessor and a plurality of peripheral devices, a computer implemented method for implementing prioritized communications, the method comprising the computer implemented steps of:

a) determining a first priority level;

b) determining a second priority level;

c) receiving a first request from a first software process for service from a peripheral device coupled to a computer system, said first request at said first priority level;

d) receiving a second request from a second software process for service from said peripheral device, said second request at said second priority level;

e) prioritizing a queue storing said first request and said second request in response to receiving said first request at said first priority level;

f) satisfying said first request in said peripheral device before satisfying said second request in said peripheral device such that said first software process receives service from said peripheral device before said second software process; and g) removing said first priority data transfer bandwidth allocation when said first software process terminates abnormally.

10. The method of claim 9 further including the steps of:

g) receiving a bandwidth allocation request from said first software process to transfer data at said first priority level between a first plurality of peripheral devices coupled to said computer system;

h) allocating a first priority data transfer bandwidth between said first plurality of peripheral devices responsive to said bandwidth allocation request;

i) performing a first data transfer between said first plurality of peripheral devices using said first priority data transfer bandwidth;

j) performing a second data transfer between a second plurality of peripheral devices using a second priority data transfer bandwidth such that said second data transfer occurs at said second plurality level; and k) ensuring said first data transfer is not disturbed by said second data transfer such that said first priority data transfer bandwidth for said first software process is guaranteed.

11. The method of claim 10 further including the step of removing said first priority data transfer bandwidth allocation when said first software process is complete.

12. The method of claim 10 wherein step h) further includes the steps of:

locking said first priority data transfer bandwidth allocation; and rejecting a subsequent bandwidth allocation request from a subsequent software process.

13. The method of claim 12 further including the step of registering an exit call back function to remove said first priority data transfer bandwidth allocation lock when said first software process terminates abnormally without removing said first priority data transfer bandwidth allocation lock.

14. The method of claim 10 further including the step of notifying said first software process when said first priority bandwidth allocation cannot be completed.

15. The method of claim 10 wherein step c) further includes receiving an application programming interface call from said first software process in a kernel bandwidth allocator to transfer said data at said first priority level.

16. The method of claim 15 further including the step of maintaining an internal table to track said first priority data transfer bandwidth in said kernel bandwidth allocator.

17. In a computer system having a microprocessor and a memory coupled to a packet switched router, a computer implemented method for implementing a priority data transfer, the method comprising the computer implemented steps of:

a) determining a first priority level;

b) determining a second priority level;

c) receiving a bandwidth allocation request from a software process to transfer data at said first priority level between a first plurality of devices coupled to a computer system;

d) allocating a first priority data transfer bandwidth between said first plurality of devices responsive to said bandwidths allocation request;

e) performing a first data transfer between said first plurality of devices using said first priority data transfer bandwidth;

f) performing a second data transfer between a second plurality of devices using a second priority data transfer bandwidth such that said second data transfer occurs at said second priority level;

g) ensuring said first data transfer is not disturbed by said second data transfer such that said first priority data transfer bandwidth for said software process is guaranteed; and h) removing said first priority data transfer bandwidth allocation when said first software process terminates abnormally.

18. The computer implemented method of claim 17 further including the steps of:

receiving a first request from said software process for service from one of said plurality of devices coupled to said computer system, said first request at said first priority level;

receiving a second request for service from said one of said plurality of devices, said second request at said second priority level;

prioritizing a queue storing said first request and said second request in response to receiving said first request at said first priority level; and satisfying said first request in said one of said plurality of devices before satisfying said second request in said peripheral device.

19. The computer implemented method of claim 17 further including the step of removing said first priority data transfer bandwidth allocation when said software process is complete.

20. The computer implemented method of claim 17 wherein step d) further includes the steps of:

locking said first priority data transfer bandwidth allocation; and rejecting a subsequent bandwidth allocation request from a subsequent software process.

21. The computer implemented method of claim 20 further including the step of registering an exit call back function to remove said first priority data transfer bandwidth allocation lock when said software process terminates abnormally without removing said first priority data transfer bandwidth allocation lock.

22. The computer implemented method of claim 17 further including the step of notifying said software process when said first priority bandwidth allocation cannot be completed.

23. The computer implemented method of claim 17 wherein step c) further includes receiving an application programming interface call from said software process in a kernel bandwidth allocator to transfer said data at said first priority level.

24. The computer implemented method of claim 23 further including the step of maintaining an internal table to track said first priority data transfer bandwidth in said kernel bandwidth allocator.

* * * * *

UNITED STATES PATENT AND TRADEMARK OFFICE

CERTIFICATE OF CORRECTION

PATENT NO. : RE 38,134 E
DATED : June 3, 2003
INVENTOR(S) : Ross et al.

It is certified that error appears in the above-identified patent and that said Letters Patent is hereby corrected as shown below:

Column 19,
Line 12, delete “sequence” and insert -- request --, therefor.
Line 64, delete “g)” and insert -- a) --, therefor.

Column 20,
Line 1, delete “h)” and insert -- b) --, therefor.
Line 4, delete “i)” and insert -- c) --, therefor.
Line 7, delete “j)” and insert -- d) --, therefor.
Line 11, delete “k)” and insert -- e) --, therefor.

Signed and Sealed this

Twenty-seventh Day of January, 2004

JON W. DUDAS
*Acting Director of the United States Patent and Trademark Office*